United States Patent
Chandrasekar et al.

(10) Patent No.: US 10,606,682 B2
(45) Date of Patent: Mar. 31, 2020

(54) SYSTEM AND METHOD OF COLLECTING SERVICEABILITY DATA IN CONTAINERS BASED CLOUD INFRASTRUCTURE

(71) Applicant: International Business Machines Corporation, Armonk, NY (US)

(72) Inventors: Krishna K. Chandrasekar, Tamil Nadu (IN); Shinoj Zacharias, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 15/454,000

(22) Filed: Mar. 9, 2017

(65) Prior Publication Data

US 2018/0260264 A1    Sep. 13, 2018

(51) Int. Cl.
 *G06F 11/00* (2006.01)
 *G06F 11/07* (2006.01)

(52) U.S. Cl.
 CPC ........ *G06F 11/079* (2013.01); *G06F 11/0787* (2013.01)

(58) Field of Classification Search
 CPC .... G06F 11/261; G06F 11/263; G06F 11/079; G06F 11/0787
 See application file for complete search history.

(56) References Cited

U.S. PATENT DOCUMENTS

| | | | |
|---|---|---|---|
| 8,234,633 B2 | 7/2012 | Schneider et al. | |
| 9,223,681 B2 * | 12/2015 | Delporte | G06F 11/3636 |
| 10,007,592 B2 * | 6/2018 | Bagchi | G06F 11/362 |
| 10,235,252 B1 * | 3/2019 | Lieberman | G06F 11/1469 |
| 2007/0074202 A1 * | 3/2007 | McMahan | G06F 8/61 717/174 |
| 2007/0220370 A1 * | 9/2007 | Branda | G06F 11/3688 714/49 |
| 2009/0133033 A1 * | 5/2009 | Lindo | G06F 11/0778 718/108 |

(Continued)

FOREIGN PATENT DOCUMENTS

WO    2016077367 A1    5/2016

OTHER PUBLICATIONS

Berman, D., "Introducing the Logz.io Docker Log Collector", May 3, 2016, 16 pages, <http://logz.io/blog/logz-io-docker-log-collector/>.

(Continued)

*Primary Examiner* — Marc Duncan
*Assistant Examiner* — Jonathan D Gibson
(74) *Attorney, Agent, or Firm* — Patterson + Sheridan, LLP (57) ABSTRACT

Embodiments of the present disclosure provide a method, system, and computer program product for collecting serviceability data for analyzing a customer's issue. An analysis agent is launched upon initiation of a trace as a result of an error. The analysis agent accesses trace specification on a customer environment to determine an order of processing for a specific task. The analysis agent maps the trace specification to a set of APIs invoked by an operating system for the specific task. The analysis recreates the error in the customer environment based on the mapping of the trace specification to the set of APIs invoked by the operating system. The analysis agent diagnoses the error while monitoring the recreation of the error in the customer environment.

20 Claims, 5 Drawing Sheets

(56) References Cited

U.S. PATENT DOCUMENTS

| | | | | |
|---|---|---|---|---|
| 2009/0138859 A1* | 5/2009 | Chen | G06F 11/3461 | 717/131 |
| 2009/0150291 A1* | 6/2009 | Anson | G06F 11/261 | 705/51 |
| 2009/0177926 A1* | 7/2009 | Schneider | G06F 11/2294 | 714/37 |
| 2010/0257515 A1* | 10/2010 | Bates | G06F 8/656 | 717/145 |
| 2011/0055815 A1* | 3/2011 | Squillace | G06F 11/3612 | 717/125 |
| 2011/0078666 A1* | 3/2011 | Altekar | G06F 11/3636 | 717/131 |
| 2011/0264787 A1* | 10/2011 | Mickens | G06F 11/3414 | 709/224 |
| 2012/0144236 A1* | 6/2012 | Black | H04L 41/145 | 714/25 |
| 2012/0166869 A1* | 6/2012 | Young | G06F 11/008 | 714/15 |
| 2013/0061210 A1* | 3/2013 | Chung | G06F 11/3664 | 717/125 |
| 2013/0339931 A1* | 12/2013 | Rode | G06F 11/3664 | 717/128 |
| 2014/0215495 A1* | 7/2014 | Erich | G06F 11/3438 | 719/318 |
| 2014/0317602 A1* | 10/2014 | Zuo | G06F 11/362 | 717/125 |
| 2014/0351650 A1* | 11/2014 | Elias | G06F 11/362 | 714/38.1 |
| 2015/0356002 A1 | 12/2015 | Arif et al. | | |
| 2015/0378864 A1* | 12/2015 | Lensmar | G06F 8/53 | 717/130 |
| 2016/0314055 A1* | 10/2016 | Bagchi | G06F 11/362 | |

OTHER PUBLICATIONS

Logentries.com, "Logentries Launches All-inclusive Monitoring of Docker Environments Using Advanced Logging Container", Jul. 23, 2015, 2 pages, <https://logentries.com/logentries-launches-all-inclusive-monitoring-of-docker-environments-using-advanced-logging-container/>.

* cited by examiner

SYSTEM AND METHOD OF COLLECTING SERVICEABILITY DATA IN CONTAINERS BASED CLOUD INFRASTRUCTURE

BACKGROUND

The present invention generally relates to customer support, and more specifically, to a method of collecting serviceability data for analyzing a customer's particular issue.

BACKGROUND

In a serviceability scenario, support engineers depend on customers to provide information about their systems where the issues are seen. The support engineers typically request data such as system logs and configuration and property files, to better understand the nature of the customer's issue. The data aids the support engineers in performing a root cause analysis to determine the trigger of the customer's issue or the scenarios in which the customer's issue is brought about.

There are several existing automation tools, which can collect data from the customer environment and provide that data to the support engineers. This often involves interaction on the part of the customer to run several manual steps with trace settings enabled to collect as much data required, as well as the path of the failures. In many situations, due to the lack of product knowledge or the communication gap between the customer and the service engineer, support engineers are not provided with the exact data requested. Much communication between the support engineers and the customer creates a friction, resulting in an unhappy customer when the process becomes time consuming to find a resolution or diagnose a problem.

SUMMARY

Embodiments of the present disclosure provide a method, system, and computer program product for collecting serviceability data for analyzing a customer's issue. An analysis agent is launched upon initiation of a trace as a result of an error. The analysis agent accesses a trace specification compiled in a customer environment to determine an order of processing for a specific tasks. The analysis agent reads the mapping of the trace specification to a set of APIs to be invoked by an operating system for the specific task. The analysis agent recreates the error in the customer environment based on the mapping of the trace specification to the set of APIs to be invoked by the operating system. The analysis agent collects the serviceability logs while monitoring the recreation of the error in the customer environment.

BRIEF DESCRIPTION OF THE SEVERAL VIEWS OF THE DRAWINGS

So that the manner in which the above recited aspects are attained and can be understood in detail, a more particular description of the embodiments of the present disclosure, briefly summarized above, may be had by reference to the appended drawings.

DETAILED DESCRIPTION

Embodiments of the present disclosure provide a method, system, and computer program product for collecting serviceability data for analyzing a customer's issue. An analysis agent is launched upon initiation of a trace specification as a result of an error detected by the customer. The analysis agent accesses trace specification compiled in a customer environment to determine an order of processing for specific tasks. The analysis agent reads the mapping of the trace specification to a set of Application Program Interfaces (APIs) to be invoked by an operating system for the specific task. The analysis agent recreates the error in the customer environment. The analysis agent collects the serviceability logs generated during the process of recreation of error in the customer environment and sends it back to the log collector. The support engineers analysis the serviceability logs collected by the log collector and can recommend the resolution to the customer issue.

Figure 1:
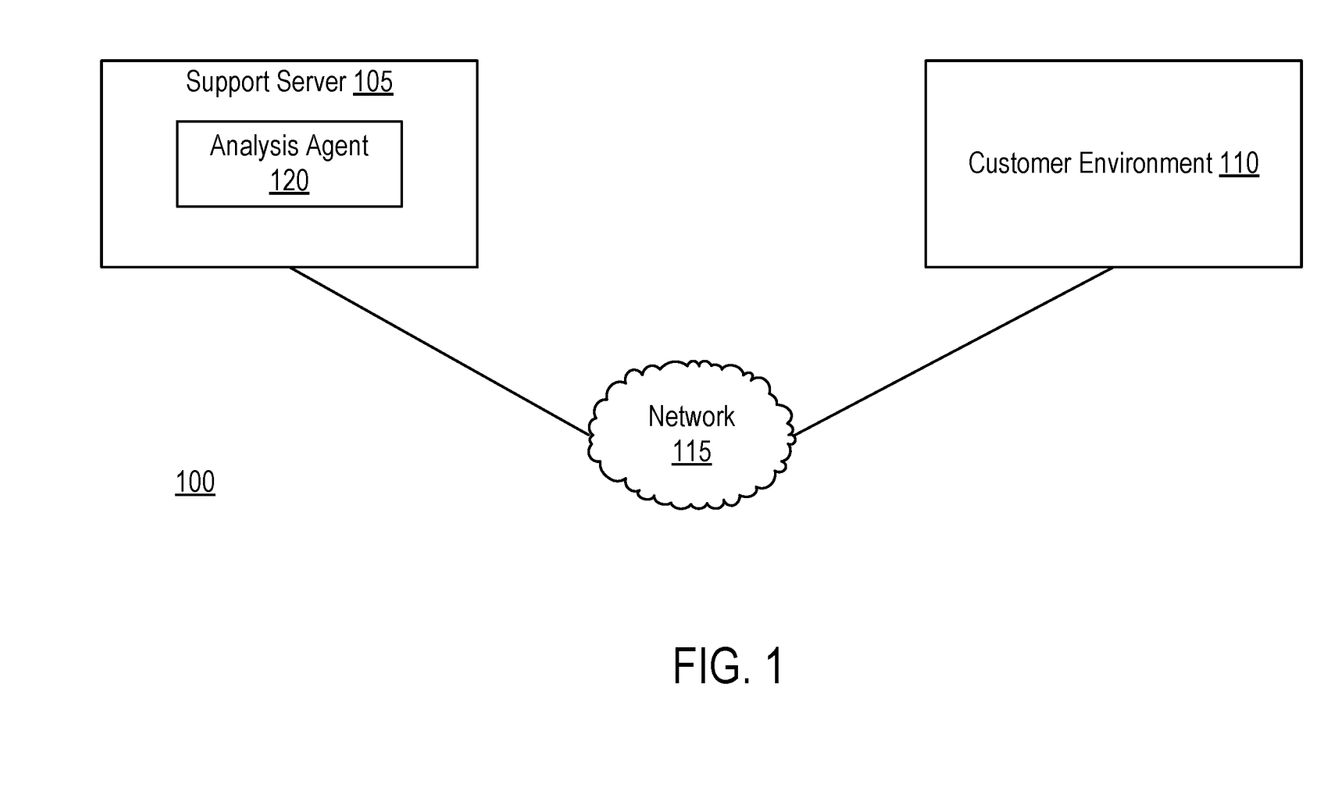
FIG. 1 illustrates a computing environment, according to one embodiment disclosed herein.

FIG. 1 illustrates a computing environment 100, according to one embodiment. The computing environment 100 includes a support server 105 communicating with a customer environment 110 over a network 115. The computing environment 100 depicted in FIG. 1 can be considered a customer service-like platform. For example, the customer environment 110 may be running a program or application commercially available from a provider of the support side 105. The provider typically provides the customer with support in the form of access to support engineers when the customer has issues with their system. In the serviceability scenario, support engineers ask the customer to provide various information about his/her system where such issues are found. Support engineers request that customers provide data, such as system logs, configuration, property files, and the like, for better understanding the nature of the problem. The support engineers use this information to find the right trigger to the problem, or the scenarios in which the problem occurs, or both.

There are several automation tools which can collect data from the customer environment and provide this data to the support engineers. This often involves customer involvement, however, to run several manual steps with trace setting enabled to collect as much data about the failure as required, as well as the paths of such failure. In most situations, due to the lack of product knowledge, or a communication gap, support engineers are not provided with the exact data requested. Additionally, usually a given customer is not concerned about the recreation of the issue, and fails to provide a data set sufficient for the support engineers. In some circumstances, customers may only be interested in providing information about the specific issue at hand. Excessive communication between the support engineers and the customers may create a friction, which results in an unhappy customer, especially when resolving the issue or diagnosing the problem becomes time consuming.

The present disclosure aids in providing a system which automates recreation of the exact problem identified by the customer and invoking related functions and the results can be leveraged by the support engineers to find the root cause and resolution of the problem as it pertains to the customer's environment. The support server 105 includes an analysis agent 120. The analysis agent 120 is configured to carry out the method discussed below in conjunction with FIG. 3 of automating the recreation of the customer's problem to find the root cause and resolution of the problem.

Figure 2:
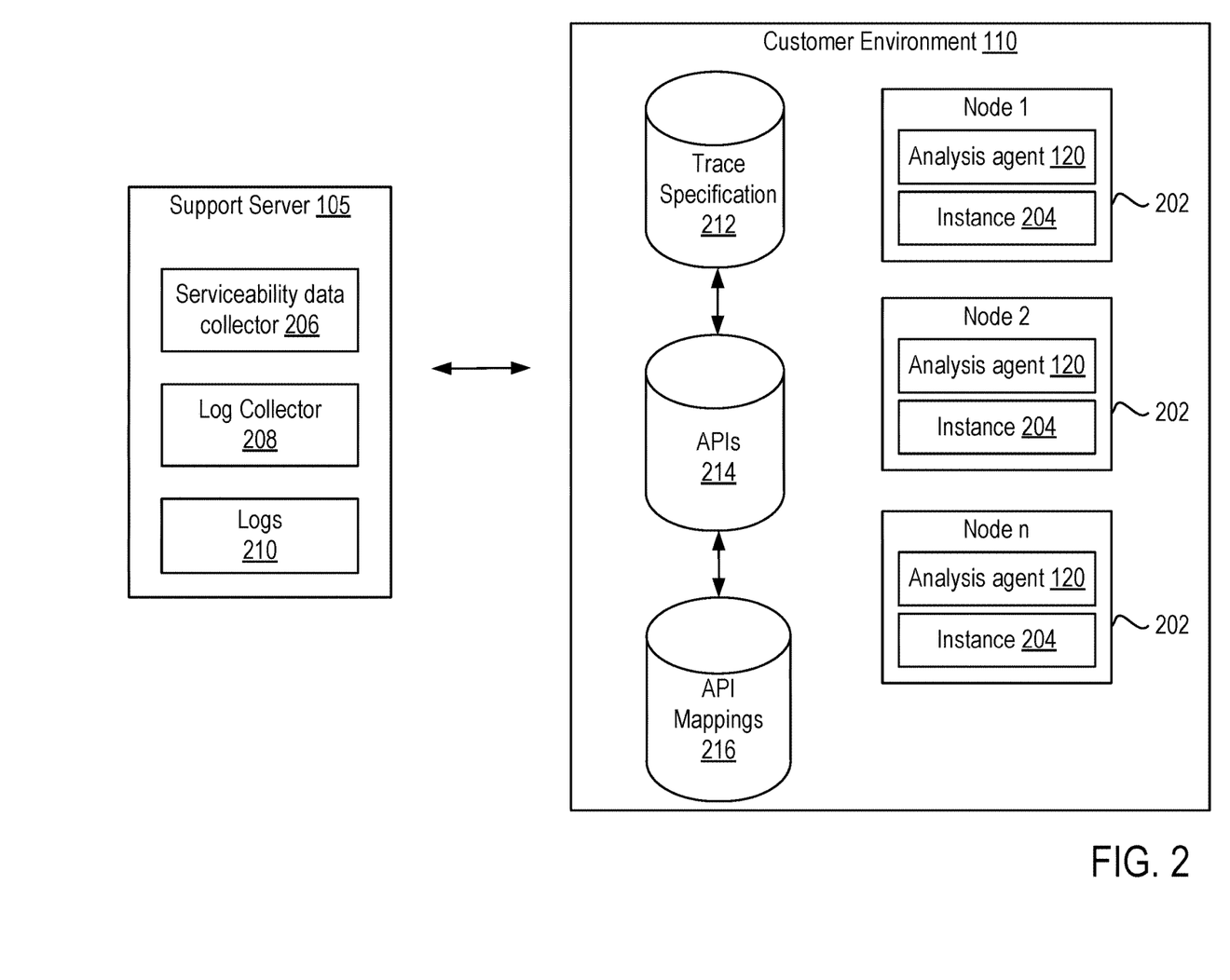
FIG. 2 illustrates a detailed view of the computing environment, according to one embodiment disclosed herein.

FIG. 2 illustrates a detailed view of the computing environment 100, according to one embodiment. The computing environment 100 illustrates the support server 105 and the customer environment 110. The customer environment 110 includes one or more nodes 202. Each of the one or more nodes 202 may support an instance of the application of the provider. For example, each of the one or more nodes 202 may be a virtual machine, a container, or a physical computer, on which the instance 204 of the application is run. Continuing with this example, an instance 204 of the application may be run using container-based virtualization, such as that commercially available from Docker, Inc. In the embodiment shown in FIG. 2, the analysis agent 120 is preloaded onto each of the one or more nodes 202 through the instance 204 of the application. In other embodiments, the analysis agent 120 may be injected into each node 202 by the support server 105.

The support server 105 is in communication with the customer environment 110 via network 115. The support server 105 is configured to provide technical support to each node 202 (e.g. Node 1 through Node N) in customer environment 110. The support server 105 includes serviceability data collector 206, log collector 208, and logs 210. The serviceability data collector 206 is configured to communicate with analysis agent 120 to begin detection of a particular customer's issue and subsequent resolution thereof. In some embodiments, the analysis agent 120 can be packaged as part of the serviceability data collector 206. In this embodiment, the analysis agent 120 may be injected into every instance 204 in each node 202. For example, the analysis agent 120 may be injected into each instance through any secured file transfer mechanism.

The customer environment 110 further includes trace specifications 212 and set of APIs 214. The trace specifications 212 contain information about a list of trace specification that can be set on the application to collect trace specification during execution of the application. Tracing applications often provide developers with information useful for debugging. The information is useful both during software development cycles and after the release of the software. When the analysis agent 120 is launched in each instance, the analysis agent 120 generates and collects all possible serviceability data required for providing multilevel support for customer's problem resolution. The analysis agent 120 receives the trace specifications 212. The analysis agent 120 then maps the trace specification 212 to the set of APIs 214 corresponding to the trace specification 212. For example, given the following trace specification:

"com.ibm.mobile.runtime.synchronization"=>1) InititateSynchronizationMBean( ), 2) PingAdmin( ), 3) GetUpdateContent( ), 4) UpdateCache, 5) CompleteSych( ), whenever the above trace specification "com.ibm.mobile.runtime.synchronization" is set, the analysis agent 120 running on each nodes reads the above set of APIs and execute them in the given order, i.e. from 1) to 5) and the trace is generated. When the analysis agent executes the set of APIs corresponding to the trace specification, serviceability logs (or trace files) are generated for that execution.

The set of APIs 214 contain the APIs for the given application. For example, the set of APIs 214 may contain the set of APIs that are invoked during specific application processes. The set of APIs 214 are those APIs are internal to one or more applications that may be run on each node. For example, the set of APIs 214 may include a first subset of APIs related to application A that may be executed on each node 202, and a second subset of APIs related to application B that may be executed on each node 202. In one embodiment, the analysis agent 120 is configured to map the sequence of executable operations pertaining to the problem identified by the customer to the sequence of APIs launched by the operating system during the operations. The mapping can be stored as configuration data in a file or a database. Determining the sequence of APIs launched by the operating system during the operation that caused the customer's issue, the analysis agent 120 is able to recreate the customer's problem for analysis.

In another embodiment, the customer environment 110 may further include API mappings 216. The API mappings 216 are pre-loaded mappings between the trace specifications and one or more sets of APIs. For example, rather than the analysis agent 120 determining the mapping between the trace specification and one or more sets of APIs on its own, the developer may pre-load onto the software mappings between a trace specification and a given set of APIs.

Figure 3:
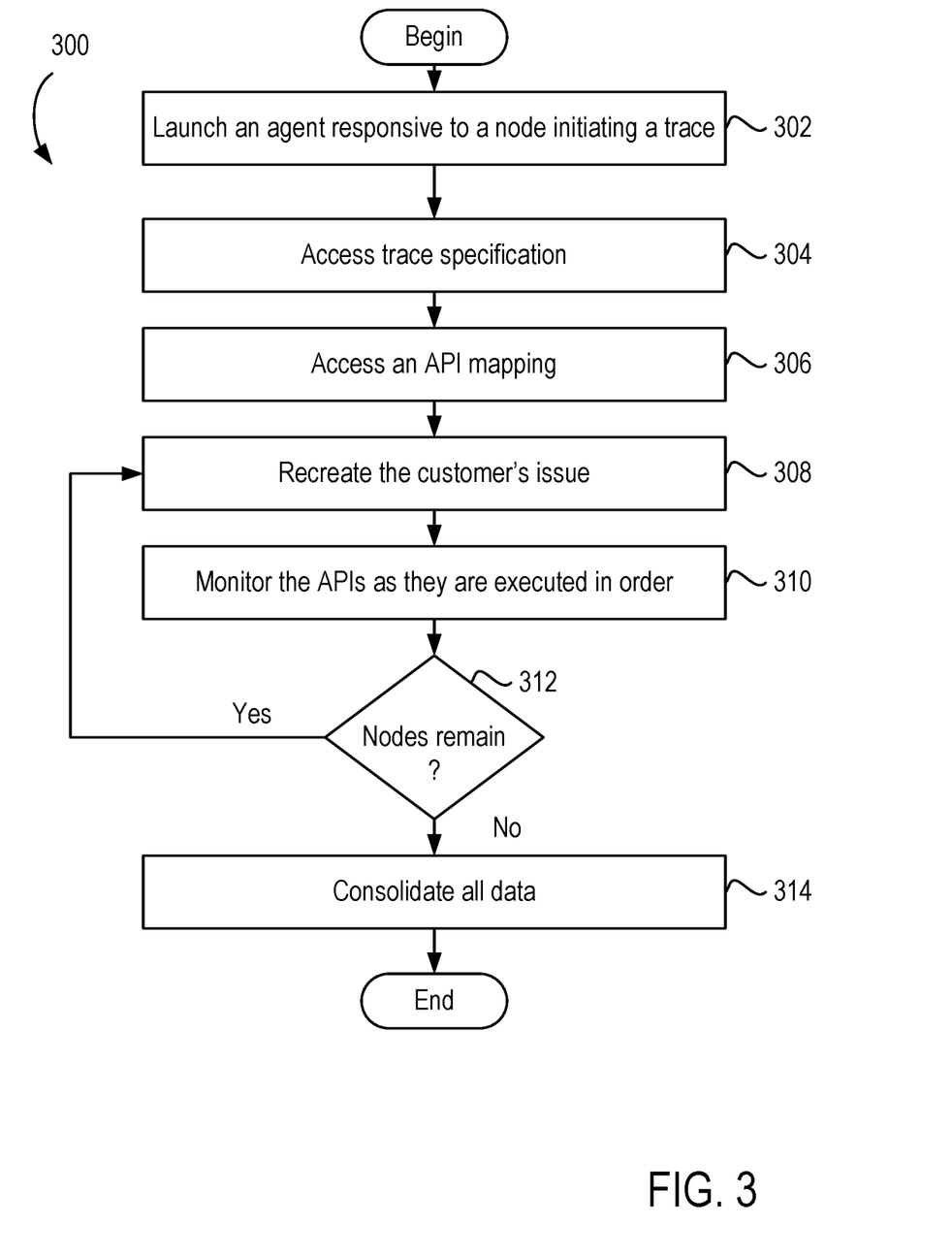
FIG. 3 illustrates a flow diagram of a method for collecting serviceability data, according to one embodiment disclosed herein.

For example, the analysis agent 120 receives a trace specification for an instance 204 in a first node 202. For example, in the scenario in which the instance crashed in node 1, the analysis agent 120 receives the trace specification corresponding to the set of processes that caused the crash. In other embodiments, the analysis agent 120 receives the trace specification after the customer initiates a trace of the application. In yet another embodiment, the analysis agent 120 initiates the trace of the application on its own initiative, and then subsequently receives the trace specification FIG. 3 illustrates a flow diagram of a method 300 for collecting serviceability data, according to one embodiment. The method 300 begins at block 302, when the customer initiates a trace of the application to log the previous execution blocks of the customer's computing environment, or node 202. Initiating the trace of the application launches the analysis agent 120.

At block 304, the analysis agent 120 accesses the trace specifications of the trace that was initiated by the customer. The trace specifications contain the information about the program's execution that is obtained from tracing the application. The analysis agent 120 collects the trace information for the trace specifications for a first node.

At block 306, the analysis agent 120 accesses a mapping between the trace specifications to a set of APIs invoked by the operating system. For example, the analysis agent 120 determines the order of commands executed by the processor and maps those commands to APIs invoked by the operating system during the specific process that was traced. Determining the set of APIs that were executed allows the analysis agent to subsequently recreate the customer's issue for analysis. In another embodiment, the analysis agent 120 accesses a pre-loaded mapping between the trace specification and the set of APIs. The trace specification corresponds to the give set of APIs.

Once the set of APIs is determined, the analysis agent is able to recreate the customer's issue in the given node. At block 308, the analysis agent 120 recreates the customer's issue by invoking the APIs in the set of APIs in the order set forth in the database. The analysis agent 120 monitors the recreation to determine the customer's issue.

At block 310, the analysis agent 120 monitors the APIs as they are executed in the monitored order in block 308. The data collected is the trace data that support engineers need to analyze the customer's problem. The data collection aids in identifying the issue causing the customer's problem that initiated the trace. Such recreation simplifies the technical support service by no longer requiring the customer to invoke functions or operations that recreate the error situation.

After the analysis agent collects the required trace data while the APIs are executed in the monitored order, the analysis agent determines if there are any nodes remaining (block 312). If there are remaining nodes, the method reverts to block 308 to run the APIs in the correct order to generate the required trace data in that given node. Recreating the issue that initiated the trace in each node provides the support engineers with wider array of information to aid in diagnosing the issue. For example, the issue brought about in node 1 by invoking the set of APIs in the correct order may not be present in node 2 when the same set of APIs are executed in the same order If the analysis agent 120 determines that there are no remaining nodes, the analysis agent consolidates all of the data from each node (block 314). The analysis agent 120 may then transmit the consolidated data to the support side for further analysis. As such, the support engineer is able to obtain all necessary data without having to walk the customer through the blocks necessary to obtain the data. Such process provides a streamlined process for the support engineer and a frustration-free process for the customer.

Figure 4:
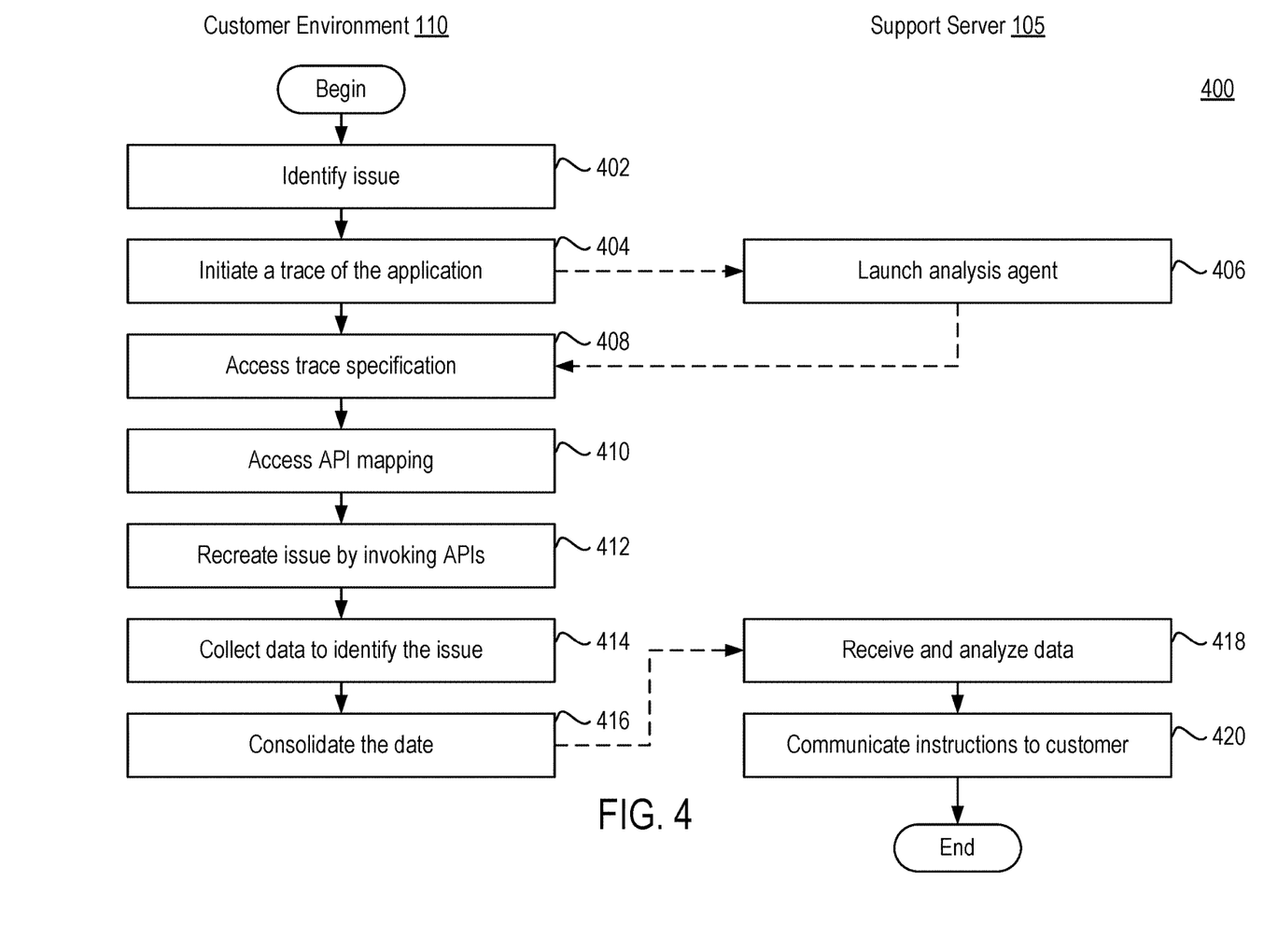
FIG. 4 illustrates a flow diagram of a method for collecting serviceability data, according to one embodiment disclosed herein.

FIG. 4 illustrates a flow diagram of a method 400 for collecting serviceability data, according to another embodiment. FIG. 4 illustrates the process over the computing environment 100, as described above in conjunction with FIGS. 1-3.

At block 402, a customer using the customer environment 110 identifies an issue with one or more customer services. For example, the issue may be repeated crashing of a service of the customer's application. In particular, the issue may be the repeated crashing of a REST API of the application. The customer then initiates a trace of the application to log the previous execution blocks of the customer's computing environment (block 404). Continuing with the above example, the customer initiates a trace of the application having the REST API service.

The customer's initiation of the trace on the client side launches an analysis agent on the support side, to provide technical support to the customer, without additional input from the customer (block 406). The analysis agent then accesses the trace specifications of the trace that was initiated by the customer (block 408). The analysis agent 120 collects the trace information for the trace specifications.

The analysis agent then accesses a mapping of the trace specifications to a set of APIs invoked by the operating system (block 410). In one embodiment, the analysis agent determines the order of commands executed by the processor from the trace specifications and maps those commands to the APIs invoked by the operating system during the specific process. In another embodiment, the analysis agent 120 accesses a pre-loaded mapping between the trace specification and a given set of APIs. The given set of APIs corresponds to the trace specification accessed in block 408. This allows the analysis agent to recreate the customer's issue for analysis. The analysis agent then recreates the customer's issue by invoking the APIs in the set of mapped APIs in the correct order (block 412). The analysis agent recreates the customer's issue by invoking the APIs in each node in the customer platform. For example, each API may be given a default parameter that may also be provided in the trace specification corresponding to the API. Depending on the trace specification, the set of APIs to be run will also include an API to initialize the state of the application or variable. If the API does not take any parameter, the analysis agent 120 invokes the set of APIs in the correct order.

The analysis agent then monitors the APIs and collects the data required to identify the cause of the customer's issue from each node (block 414). As can be understood, such recreation of the customer's issue by the analysis agent allows the support side to adequately identify, and subsequently solve, the customer's issue without participation (or at most minimal participation) from the customer. The analysis agent then consolidates all the data collected from the plurality of nodes and transmits the data to the support server for analysis (block 416). The support server receives the data from the analysis agent, and analyzes the data in hopes of identifying and resolving the customer's issue (block 418). If a resolution is found, the support server may communicate instructions to the customer to help resolve the identified issue (block 420).

Figure 5:
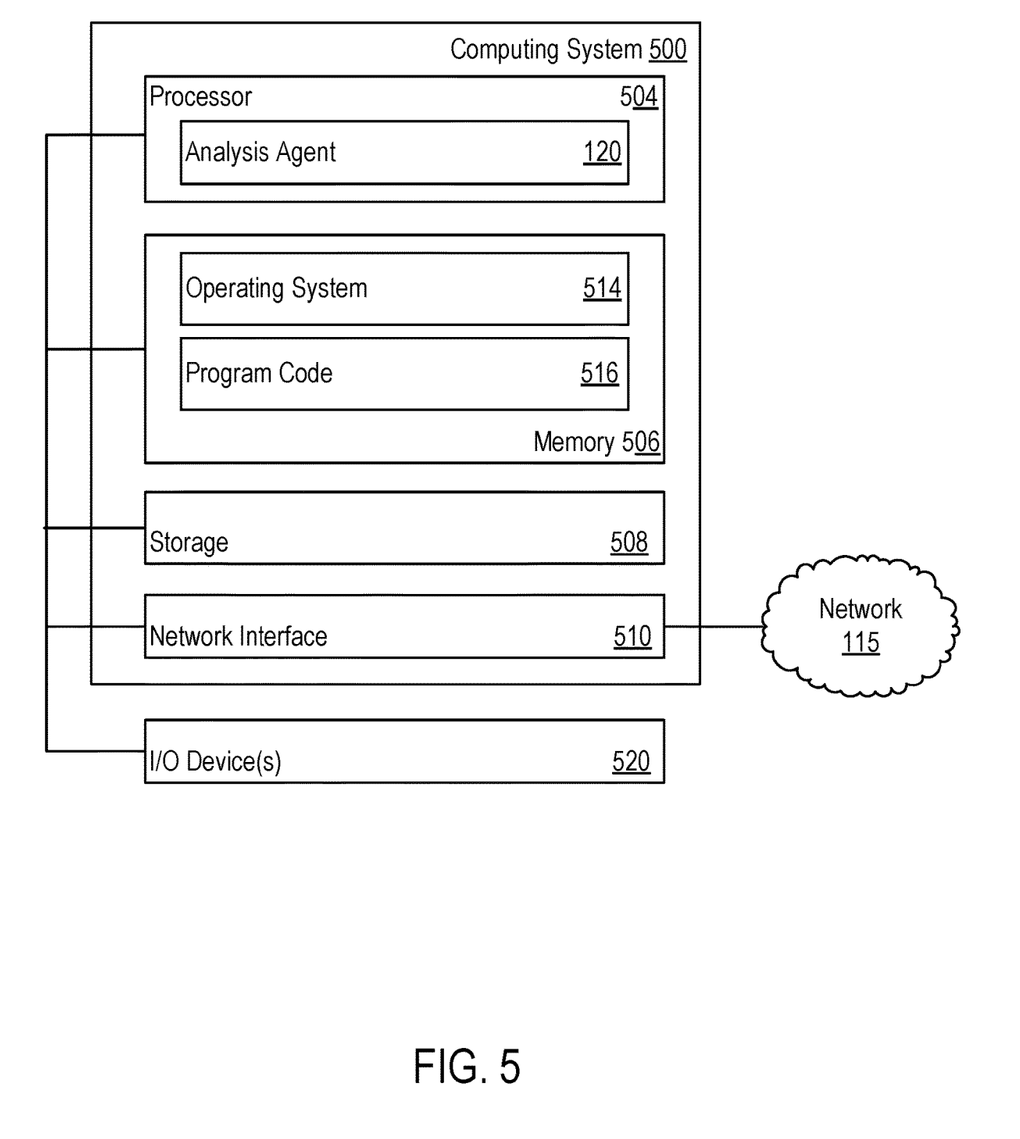
FIG. 5 illustrates a computer system, according to one embodiment disclosed herein.

FIG. 5 illustrates a computer system 500, according to one embodiment. The computer system 500 includes a processor 504, a memory 506, storage 508, and a network interface 510. The computer system 500 may be coupled to I/O devices 520. The processor 504 may be any processor capable of performing the functions described herein. The computer system 500 may connect to the network 115 using the network interface 510. Furthermore, as will be understood by one of ordinary skill in the art, any computer system capable of performing the functions described herein may be used.

The processor 504 includes the analysis agent 120. The analysis agent 120 is configured to carry out the method discussed below in conjunction with FIG. 3 of automating the recreation of the customer's problem to find the root cause and resolution of the problem. When the analysis agent 120 is launched in each instance, the analysis agent 120 generates and collects all possible serviceability data required for providing multilevel support for customer's problem resolution.

In the pictured embodiment, the memory 506 contains an operating system 514 and program code 516. Although memory is shown as a single entity, memory 506 may include one or more memory devices having blocks of memory associated with physical addresses, such as random access memory (RAM), read only memory (ROM), flash memory, or other types of volatile and/or non-volatile memory. The program code 516 is configured to carry out the method for collecting serviceability data discussed in conjunction with FIGS. 3-4. The memory 506 is an example of tangible media configured to store data, such as trace data, APIs invoked, and the like. Other types of tangible media include floppy disks, removable hard disks, optical storage media, such as CD-ROMs and DVDs, bar codes, and the like.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to embodiments of the present invention, other and further embodiments of the invention may be devised without departing from the basic scope thereof, and the scope thereof is determined by the claims that follow.

What is claimed is:

1. A method comprising:
   identifying an error on a first node of a plurality of nodes in a computing environment;
   responsive to identifying the error on the first node, initiating a trace of the error;
   upon initiating the trace of first error, launching a respective analysis agent on each of the plurality of nodes;
   receiving a trace specification of the computing environment to determine an order of processes for a specific task performed by the computing environment;
   recreating the error on each of the plurality of nodes by, for each respective node of the plurality of nodes:
      accessing a respective mapping of the trace specification to a respective set of APIs invoked by an operating system of the respective node for the specific task;
      initializing a state of an application on the respective node based on the trace specification;
      based on the respective mapping of the trace specification to the respective set of APIs invoked by the operating system of the respective node, executing the respective set of APIs in the respective node in an order specified by the trace specification; and
      monitoring the execution of the respective set of APIs to generate respective trace data;
   generating consolidated error data for the computing environment based on recreating the error on each of the plurality of nodes, wherein the consolidated error data includes the respective trace data from each respective node of the plurality of nodes, and wherein the consolidated error data indicates that at least a second node of the plurality of nodes failed to recreate the error; and
   diagnosing the error based on the consolidated error data.

2. The method of claim 1, wherein recreating the error in the computing environment comprises: invoking the set of APIs in an order corresponding to the order of processes.

3. The method of claim 1, wherein recreating the error in the computing environment includes: recreating the error in each instance in the computing environment.

4. The method of claim 3, wherein the instance is one of a virtual machine, a container, or a physical computer.

5. The method of claim 3, wherein launching the analysis agent upon initiation of the trace as the result of the error comprises: injecting the analysis agent into each instance in the computing environment.

6. The method of claim 1, wherein diagnosing the error while analyzing the set of APIs launched in the computing environment comprises: collecting serviceability data to provide to transmit to a support server for analysis.

7. The method of claim 1, wherein accessing the mapping of the trace specification to the set of APIs invoked by the operating system for the specific task comprises: accessing a list of pre-loaded API mappings, wherein each API mapping includes at least one specification mapped to at least one set of APIs.

8. A system, comprising:
   a computer processor; and
   a memory containing a program that, when executed on the computer processor, performs an operation, comprising:
      identifying an error on a first node of a plurality of nodes in a computing environment;
      responsive to identifying the error on the first node, initiating a trace of the error;
      upon initiating the trace of first error, launching a respective analysis agent on each of the plurality of nodes;
      receiving a trace specification of the computing environment to determine an order of processes for a specific task performed by the computing environment;
      recreating the error on each of the plurality of nodes by, for each respective node of the plurality of nodes:
         accessing a respective mapping of the trace specification to a respective set of APIs invoked by an operating system of the respective node for the specific task;
         initializing a state of an application on the respective node based on the trace specification;
         based on the respective mapping of the trace specification to the respective set of APIs invoked by the operating system on the respective node, executing the respective set of APIs in the node in an order specified by the trace specification; and
         monitoring the execution of the respective set of APIs to generate respective trace data;
      generating consolidated error data for the computing environment based on recreating the error on each of the plurality of nodes, wherein the consolidated error data includes the respective trace data from each respective node of the plurality of nodes, and wherein the consolidated error data indicates that at least a second node of the plurality of nodes failed to recreate the error; and diagnosing the error based on the consolidated error data.

9. The system of claim 8, wherein recreating the error in the computing environment comprises: invoking the set of APIs in an order corresponding to the order of processes.

10. The system of claim 8, wherein recreating the error in the computing environment includes: recreating the error in each instance in the computing environment.

11. The system of claim 10, wherein the instance is one of a virtual machine, a container, or a physical computer.

12. The system of claim 10, wherein launching the analysis agent upon initiation of the trace as the result of the error comprises: injecting the analysis agent into each instance in the computing environment.

13. The system of claim 8, wherein diagnosing the error while analyzing the set of APIs launched in the computing environment comprises: collecting serviceability data to provide to transmit to a support server for analysis.

14. The system of claim 8, wherein accessing the mapping of the trace specification to the set of APIs invoked by the operating system for the specific task comprises: accessing a list of pre-loaded API mappings, wherein each API mapping includes at least one specification mapped to at least one set of APIs.

15. A computer program product comprising:
a computer-readable storage medium having computer-readable program code embodied therewith, the computer-readable program code executable by one or more computer processors to perform an operation comprising:
identifying an error on a first node of a plurality of nodes in a computing environment;
responsive to identifying the error on the first node, initiating a trace of the error;
upon initiating the trace of first error, launching a respective analysis agent on each of plurality of nodes;
receiving a trace specification of the computing environment to determine an order of processes for a specific task performed by the computing environment;

recreating the error on each of the plurality of nodes by, for each respective node of the plurality of nodes:
accessing a respective mapping of the trace specification to a respective set of APIs invoked by an operating system of the respective node for the specific task;
initializing a state of an application on the respective node based on the trace specification;
based on the respective mapping of the trace specification to the respective set of APIs invoked by the operating system of the respective node, executing the respective set of APIs in the respective node in an order specified by the trace specification; and
monitoring the execution of the respective set of APIs to generate respective trace data;
generating consolidated error data for the computing environment based on recreating the error on each of the plurality of nodes, wherein the consolidated error data includes the respective trace data from each respective node of the plurality of nodes, and wherein the consolidated error data indicates that at least a second node of the plurality of nodes failed to recreate the error; and
diagnosing the error based on the consolidated error data.

16. The computer program product of claim 15, wherein recreating the error in the computing environment comprises: invoking the set of APIs in an order corresponding to the order of processes.

17. The computer program product of claim 15, wherein recreating the error in the computing environment includes: recreating the error in each instance in the computing environment.

18. The computer program product of claim 17, wherein the instance is one of a virtual machine, a container, or a physical computer.

19. The computer program product of claim 17, wherein launching the analysis agent upon initiation of the trace as the result of the error comprises: injecting the analysis agent into each instance in the computing environment.

20. The computer program product of claim 15, wherein diagnosing the error while analyzing the set of APIs launched in the computing environment comprises: collecting serviceability data to provide to transmit to a support server for analysis.

* * * * *